May 28, 1940.  G. T. JACOCKS  2,202,492
FLUID COUPLING
Filed Dec. 14, 1937   2 Sheets-Sheet 1

INVENTOR
George T. Jacocks.
BY Nathaniel Ely
ATTORNEY

May 28, 1940.　　　　G. T. JACOCKS　　　　2,202,492
FLUID COUPLING
Filed Dec. 14, 1937　　　　2 Sheets-Sheet 2
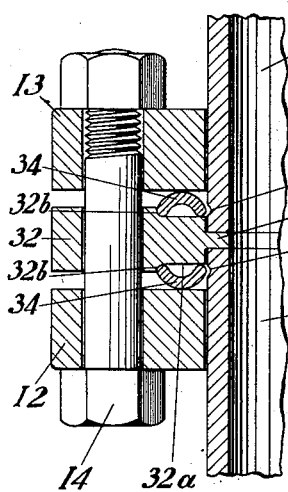
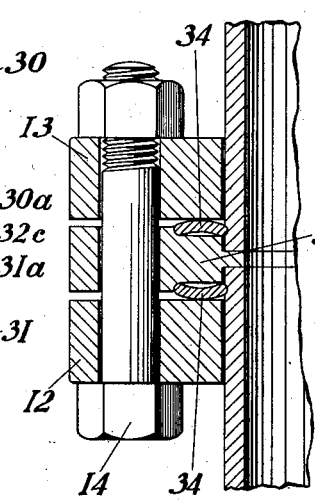
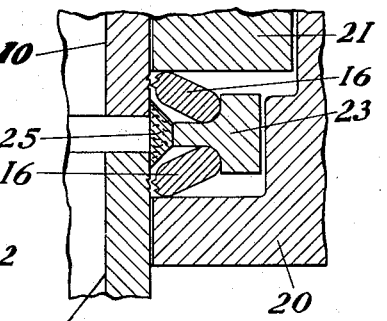
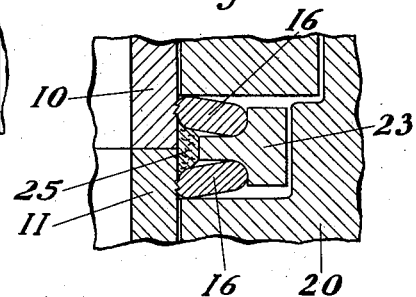
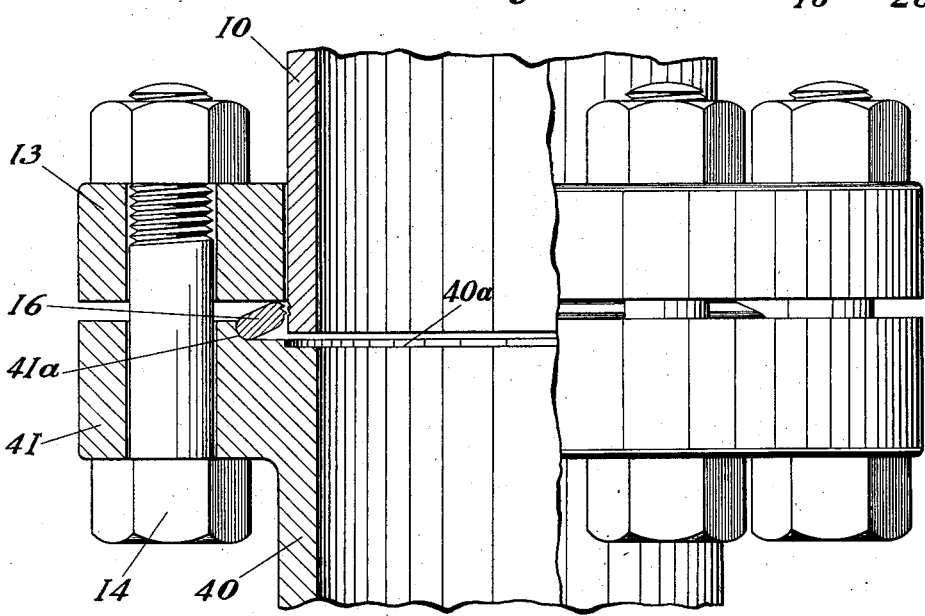
INVENTOR
George T. Jacocks.
BY Nathaniel Ely
ATTORNEY Patented May 28, 1940

2,202,492

UNITED STATES PATENT OFFICE 2,202,492

FLUID COUPLING

George T. Jacocks, Larchmont, N. Y., assignor to The Lummus Company, New York, N. Y., a corporation of Delaware Application December 14, 1937, Serial No. 179,653

7 Claims. (Cl. 285—137)

This invention relates to improvements in couplings for high pressure and high temperature fluid conduits and to an improved form of gasket therefor.

One of the principal objects of the invention is to provide a separable coupling for a fluid conduit, said coupling being removable from the conduit, and provided with a gasket which simultaneously seals the joint and holds the conduit against axial movement.

Another object of the invention is to provide a pipe joint having an annular, external gasket which normally fits over the outer diameter of the pipe to be sealed, such gasket being forced into a partially deformed state against the outer wall as the pipes are coupled, the gasket movement being under a mechanical advantage which gives a greater sealing pressure than the total compression on the coupling.

Another object of the invention is to provide an improved fluid tight coupling for high pressure conduits which is provided with sealing gaskets of frusto-conical shape, which, when compressed, are adapted to draw the conduit ends together and simultaneously seal them.

A still further object of the invention is to provide a fluid conduit coupling having a plurality of cooperating gaskets, each of which is moved into a sealing relation with a part of the conduit, with an intermediate guide with which another portion of the gaskets react, thereby relieving the coupling of multiple forces.

A more specific object of the invention is to provide a coupling for fluid conduits having an annular gasket of arcuate or kidney shaped cross section which is movable into sealing position by pressure applied to flatten the arc.

Further objects and advantages of the invention will appear from the following description of preferred forms of embodiment thereof, taken in connection with the attached drawings, in which:

Figures 5 and 6 are detailed sectional views of a part of a coupling such as shown in Figure 3, with a packing shown between the gaskets, the coupling being shown in unsealed and sealed position;

Figures 7 and 8 are detailed vertical sections through a still further modified form of coupling shown in the unsealed and sealed position; and Figure 9 is a partial elevation with parts in section, of a pipe coupling for securing a pipe end to a flanged member.

It has heretofore been proposed that high pressure pipe couplings be provided with a frusto-conical gasket, as generally described in the patent to Wilbur G. Laird, No. 1,825,962, patented October 6, 1931. With such a gasket, extremely high sealing pressures can be obtained by virtue of the toggle action inasmuch as the sealing force is a reaction at the edges of the gasket and is in excess of the total compressive force. The partial rotation of the gasket from the initial angle to the final low angle position, due to this force, will be sufficient to take up for any desired clearance conditions.

I have found, however, that greater economy can be obtained in the manufacture of the coupling by eliminating the usual pipe flanges described in the above patent, as these flanges are not only expensive, but must, in turn, be made pressure tight. In other words, the joint between the flanges and the pipe, which is also subject to leakage under high pressure, is entirely eliminated in accordance with my invention, although the pipe ends are held as tight to each other as before.

Figure 2:
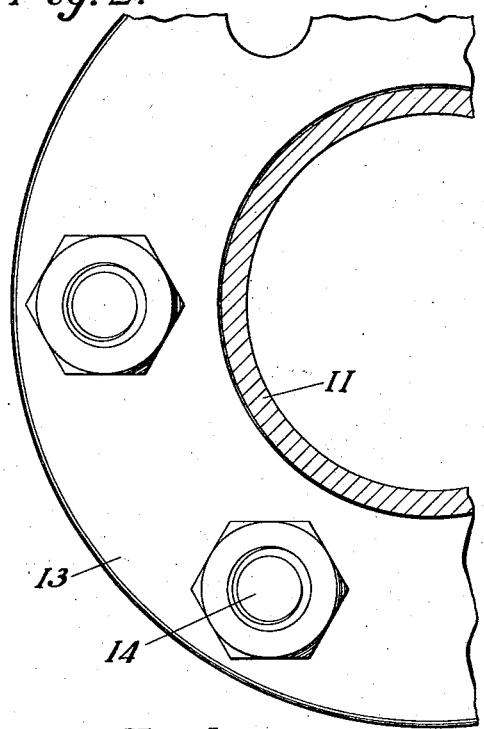
Figure 2 is a partial plan view with parts in section of the coupling shown in Figure 1.
Figure 4:
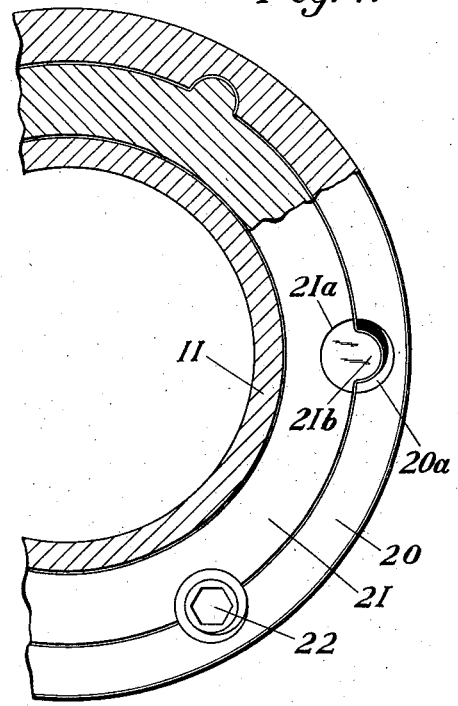
Figure 4 is a partial plan view of the coupling shown in Figure 3 with parts broken away and shown in section.
Figure 1:
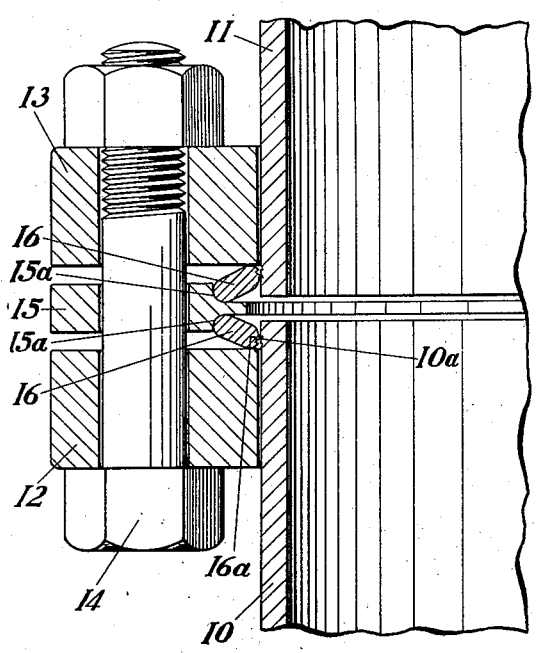
Figure 1 is a partial vertical section through a pipe coupling.

In accordance with one preferred form of embodiment of my invention, as more particularly shown in Figures 1 and 2, the pipe ends are generally indicated at 10 and 11 and may be provided with shallow concentric serrations 10a. Adjacent the ends of the pipe, I provide a pair of rings 12 and 13 which correspond to pipe flanges, in that they are relatively thick and are suitably perforated to receive the securing bolts 14. However, these rings 12 and 13 differ from pipe flanges in that they are not directly secured to the pipe ends 10 and 11, but in fact have a substantial clearance so that they may be readily slipped over the ends of the pipe. They may be made in any desired manner and need not be made with any high degrees of accuracy as would be required with typical pipe flanges as they are not fluid pressure carrying members.

Intermediate the rings 12 and 13 is provided a third annular member which may be referred to as the guide or reaction ring 15 and it is also preferably perforated for the securing bolts 14. This ring may have a larger internal diameter than the outside diameter of the pipes 10 and 11 and is provided with a pair of shoulders 15a, which are of rounded nature and cooperate with the gaskets 16 which are of the frusto-conical type. These gaskets are normally of such a size that with their normal angular relation, they are free to slide over the pipe ends 10 and 11. They are preferably provided with ribs 16a on the pipe contacting edge, which in this form is the inner edge.

The fluid conduits 10 and 11 are made pressure tight by the bolts 14 which, when screwed tight, draw the rings 12 and 13 together and this, in turn, comprises the gaskets 16. As the outer diameter is restrained by the shoulders 15a, the inner diameter becomes of smaller radius and engages the pipe ends. As the compression is continued, the gaskets 16 not only engage the pipe ends 10 and 11, but will give them an axial movement, forcing the pipe ends together and causing an embedment of the ribs 16a into the pipe. This prevents axial movement of the pipe ends after they are brought into abutting contact, and the positive abutting contacts prevent erosion of the ends. With such an embedment, internal fluid pressures can be developed up to the capacity of the pipe.

I have found that if the gaskets have an initial angular relation of 30 degrees or less, and are compressed to a final position of approximately 10 degrees, adequate movement is provided for the desired embedment and overcoming of manufacturing tolerance. It will be obvious, however, that the relative angular change and the initial angular position can be varied within substantial limits and, with low clearances, a great angular change is unnecessary. A flow of metal into the pipe makes a positive seal and yet the mechanical advantage of sealing the gasket permits the use of fewer bolts to hold the pipe ends against the axial tendency to move.

The removal of the coupling rings 12 and 13 is readily accomplished by merely releasing the securing bolts 14 and the gaskets, which are of a sufficiently ductile and resilient material, preferably mild steel, will tend to open up and break the joint. Each gasket seals one conduit member with respect to the intermediate guide ring 15 and a uniform pressure is exerted by each gasket. Only this member 15 needs to be carefully machined with the lowered cost of manufacture. Furthermore, there is no difficulty as to alignment of the bolt holes, the rings being freely movable on the pipe ends.

Figure 3:
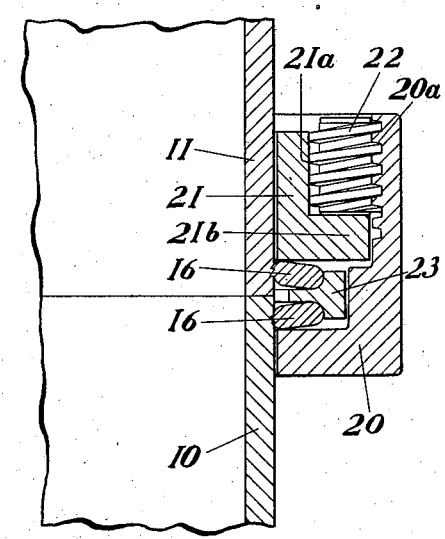
Figure 3 is a partial vertical section of a modified form of coupling.

In Figure 3, a modified form of construction is shown in which the pipe ends 10 and 11 are similarly secured by frusto-conical gaskets 16, but in this case the securing members include a pair of mutually telescopic rings 20 and 21, the smaller of which fits within the larger one. Both rings are freely movable along the pipe ends, with the outer ring 20 having a skirt or extension portion 20a which is suitably screw threaded at intervals to receive the compression screw 22. Only the skirt 20a is provided with the screw thread, and the remainder of the hole has a smooth bore 21a on the internal member 21 so that relative movement is possible between the respective rings.

The screws 22 are in compression rather than tension in this form, with the result that temperature changes tend to increase the security of the joint by causing an expansion of the screws. Furthermore, the reaction of the screw 22 is applied through the relatively thin ledge 21b so that the pressure is direct and less influenced by temperature conditions. The outside diameter of the outer ring 20 may also be smaller than in the prior form, for by making the abutting surface 21b large, smaller maximum pressures on the screw threads are possible with a greater holding pressure between the rings 20 and 21.

Any possible seepage of fluid from the interior of the pipes to the gaskets, if found to exist, can be prevented by a form of packing generally indicated at 25 as shown in Figures 5 and 6. With the internal ring 21 forced into sealing position against the gaskets 16, the packing 25 will be compressed as shown in Figure 6 to effectively seal the pipe ends 10 and 11 with respect to the gaskets 16. A truncated pyramidal cross section of packing is preferable and with the guide ring 15 serving as an external stop, it will be apparent that the packing 25 may be forced tight between the gaskets 16 and the pipe ends.

A modified form of construction of joint is shown in Figures 7 and 8 in which the pipe ends are generally indicated at 30 and 31, the outer walls of which are provided with shallow grooves 30a and 31a. The rings 12 and 13 are adapted to be drawn together by bolts 14 as previously described. The intermediate guide ring 32 is different, however, and is provided with indented flat surfaces 32a having gasket receiving shoulders 32b. The projection 32c of the guide ring 32 extends between the ends of the pipes 30 and 31 to establish the closed position of the pipe ends and to center the guide ring for resisting the axial component of the compression on the gaskets 34.

The gaskets 34 are annular and are of arcuate or kidney shape in cross section, and the crown of the gaskets is contacted by the coupling rings 12 and 13 with the free edge of the gaskets 34 approximately in line with the grooves 30a and 31a in the pipe ends when the pipe ends are together. The other edge of the gaskets abut the shoulders 32b on the ring 32.

As will appear from Figure 8, compressing rings 12 and 13, by tightening on bolts 14, tends to flatten out the kidney shaped gaskets 34 so that the free ends will engage in a positive and sealing manner with the grooves 30a and 31a in the pipe ends. A substantial mechanical advantage is obtained and if the gaskets are relatively thin, although of arcuate cross section, excessive compression pressure is unnecessary to accomplish a high pressure seal. The pipe is also positively held against any axial movement by the gaskets and as the pipe ends are initially placed in abutting relation, erosion is prevented.

The gaskets 34 may be of uniform cross section and repeated flexure is possible without damage to the structure. The seal is accomplished by a flow of metal as the inner diameter is reduced by the compression. This is preferable to increasing the outer diameter, although under some conditions, this can also be accomplished, as for example with an internal gasket.

The kidney shaped gasket 34 preferably operates in one plane and it may expand on either or both edges. High sealing pressures are also obtainable when the gasket is of generally conical or frusto-conical form, and in such case, flow of the metal to accomplish the seal is more easily accomplished, My invention is also adapted to the attachment of fluid conduits to flanged fittings as shown in Figure 9. In this structure, the fitting 40 has a flange 41 to receive the securing means 14 and the fluid conduit 10 is secured to it by the ring 13 and sealed by gasket 16 in accordance with the first form of construction. The gasket 16 is conveniently provided with a ribbed edge and when the parts are drawn together, the ribs of the gasket will become embedded in the conduit. A shoulder 41a in the fitting cooperates with the edge of the gasket and the application of pressure on the securing screws 14 causes a rotation of the gasket 16 to draw the pipe end 10 against the fitting 40. This fitting may have a recess 40a into which the pipe end may extend to promote stream line flow and prevent erosion.

It will also be understood that a single gasket of the kidney shape type can similarly be provided where a flange fitting is used on one side and a floating ring is used on the other. In such case the parts are initially brought together with the subsequent compression sealing the joint and preventing axial movement.

It is to be understood that a "pipe" as used herein is a generic term connoting a hollow, usually but not necessarily cylindrical, shaped member in which fluids are retained. The joint is commonly between the ends of two pipes, but may be equally as well between a pipe and other fitting, or may be between a cap or closure and the pipe end. Such pipes are commonly of small diameter but I am not to be limited to any size as a cover for a shell of three feet or more in diameter is equally as well sealed by the hereinbefore described gaskets.

While I have shown preferred forms of embodiment of my invention, I am aware that modifications may be made thereto and I therefore desire a broad interpretation of my invention within the scope and spirit of the description herein and of the claims appended hereinafter.

I claim:

1. A pipe coupling for a plurality of pipes of substantially uniform annular cross section which comprises a plurality of annular rings slidably and detachably mounted on the ends of the pipe, a plurality of frusto-conical gaskets, means to move the rings to change the angular relation of the gaskets, means to resist the external tendency of movement of the gaskets, continuous annular ribs on the gaskets to engage the external wall of the pipe ends, said ribs forming a liquid tight seal with the respective pipe ends and moving the pipe ends together and holding the pipe ends together without deforming the internal diameter of the pipe ends.

2. The frusto-conical gasket for a pressure tight joint which in cross section has a substantially flat body portion, the outer edge portion of which is arcuate and the minor inner edge of which is provided with projecting ribs, said ribs being substantially concentric, continuous and inclined, the inclination of which is opposite to the angularity of the gasket.

3. A fluid tight coupling for connecting a pipe to another member which comprises a compression ring detachably supported on said pipe, a continuous gasket having internal ribs normally freely supported on said pipe, said gasket being between said ring and said second member, means to draw the ring to the second member to deform the gasket, thereby forcing the ribs into the outer wall of said pipe to make a liquid tight joint therewith and to resist longitudinal movement of said pipe in shear.

4. A fluid tight coupling for connecting a pipe to another member which comprises a compression ring detachably supported on said pipe, a continuous gasket having internal ribs normally freely supported on said pipe, said gasket being between said ring and said second member, means to draw the ring to the second member to deform the gasket, thereby forcing the ribs into the outer wall of said pipe to make a liquid tight joint therewith and to resist longitudinal movement of said pipe in shear, said gasket being of frusto-conical shape and normally drawing the pipe end toward the second member as the gasket is deformed.

5. A coupling to secure, liquid tight, the ends of tubular elements, which comprises a plurality of frusto-conical ring members inclined with respect to each other and having continuous annular ribs on the smaller diameter, said ribs being adapted to penetrate the outer walls of the tubular elements to make leak-proof joints, and means to reduce the angularity between the ring members to cause such penetration, said means comprising freely movable rings engaging said frusto-conical ring members, means to draw said freely movable rings together, and means to seal the frusto-conical ring members with respect to each other thereby making a continuous seal between the respective tubular elements.

6. A coupling as claimed in claim 5, in which said means to draw rings together includes a series of compression screws, said screws being screw threaded into one of the freely movable rings and in abutting relation with an adjacent non-threaded portion of the other end.

7. A gasket for forming a fluid tight joint between telescoping cylindrical members, said gasket being a ring of frusto-conical shape having continuous annular ribs projecting from its inner edge and forming an extension thereof.

GEORGE T. JACOCKS.

CERTIFICATE OF CORRECTION.

Patent No. 2,202,492.  May 28, 1940.

GEORGE T. JACOCKS.

It is hereby certified that error appears in the printed specification of the above numbered patent requiring correction as follows: Page 2, first column, line 14, for the word "comprises" read --compresses--; page 3, first column, line 57, claim 2, strike out "minor"; and second column, line 1, after "edge" insert --portion--; and that the said Letters Patent should be read with this correction therein that the same may conform to the record of the case in the Patent Office.

Signed and sealed this 17th day of September, A. D. 1940.

Henry Van Arsdale,
Acting Commissioner of Patents.

(Seal)